Patented May 17, 1938

2,118,007

UNITED STATES PATENT OFFICE 2,118,007

PROCESS OF PRODUCING ALCOHOL BY THE CATALYTIC HYDROGENATION OF ESTERS OF CARBOXYLIC ACIDS

Lloyd W. Covert, Philadelphia, and Chester E. Andrews, Overbrook, Pa., assignors to Röhm & Haas Company, Philadelphia, Pa.

No Drawing. Application May 9, 1935, Serial No. 20,602

14 Claims. (Cl. 260—156)

This invention relates to catalysts which may be used for the hydrogenation of esters of carboxylic acids to produce alcohols. It relates more particularly to catalysts containing essentially cobalt and silver for the hydrogenation of esters to alcohols. Hereinafter the term esters will be used to include esters in general regardless of the nature of the carboxylic acids or alcohols from which they are derived.

Relatively few catalysts are known which successfully bring about the hydrogenation of esters to alcohols. It is known that certain copper catalysts are suitable for this purpose. We have now found that catalysts containing cobalt together with silver are very effective for the catalytic hydrogenation of esters to alcohols.

We have found that an intimate mixture of cobalt and silver (or their oxides) is superior to either of these metals (or oxides) alone. Only slight hydrogenation of esters to alcohols can be obtained with cobalt catalysts or with silver catalysts when used by themselves. We have found that cobalt together with silver forms very satisfactory catalysts for hydrogenating esters to alcohols.

These catalysts may be prepared in any convenient manner such that there is obtained an intimate mixture of the components in a finely divided condition free of catalyst poisons. This is readily accomplished by igniting a mixture of the nitrates or coprecipitated hydroxides, carbonates or other compounds which, when ignited, will yield the oxides of the metals. It may be that part of the silver oxide so formed is decomposed to silver. Examples of methods for preparing cobalt-silver catalysts are the following:

The nitrates of cobalt and silver may be dissolved together in water, evaporated to dryness with stirring and heated sufficiently to effect decomposition of the nitrates.

If it is desired to support the catalytic material, the aqueous solution of cobalt and silver nitrate may be incorporated on the support and the mass ignited to effect decomposition of the nitrates.

Other sources of cobalt and silver may be used. For example, the carbonates or acetates may be used. It is necessary to get an intimate mixture of the metals and this may be done by dissolving the salts together in water with sufficient nitric acid for example to effect solution.

These catalysts may be prepared by igniting coprecipitated compounds of cobalt and silver which yield the oxides when ignited. For example, the carbonates or hydroxides are conveniently coprecipitated from solutions of cobalt and silver salts. In this manner it is possible by washing the precipitate to eliminate soluble salts which may not be decomposed during ignition.

These catalysts may be supported on inert supports such as diatomaceous earth or pumice or they may be used in an unsupported condition. We prefer to use supported catalysts because a greater economy of catalytic material is thereby effected.

These catalysts may contain small proportions of other metals; however it is not necessary to have other metals present. We have found that the incorporation of considerable amounts of other metals such as aluminum, chromium, iron or even nickel results in a less satisfactory catalyst.

These catalysts may be used in the unreduced or the reduced form but we find that the unreduced form has marked advantages over the reduced form. In the unreduced form the cobalt is present as the oxide. The silver may be present as the oxide, or may be a mixture of metal and oxide, or may be present in the metallic form.

The proportion of cobalt to silver in these catalysts is not particularly important. For example a proportion of one part of cobalt to one part of silver is very satisfactory. The proportion of silver may be considerably reduced without affecting seriously the nature of the catalyst. For example, a proportion of five parts of cobalt to one part of silver is satisfactory. Inferior catalysts are obtained when the proportion is greater than 10 to 1 with respect to either cobalt or silver.

These catalysts may be used for either batch processes or continuous flow system processes. For batch processes it is desirable to have the catalyst in a finely divided condition. For flow system processes it is desirable to have the catalyst in the form of pieces or particles of such a size that it will not flow with the liquid.

These catalysts may be used repeatedly. When the activity is reduced, these catalysts can be recovered very satisfactorily to yield re-activated catalysts practically as efficient as the original catalyst. This process consists in the removal of any organic matter present and reoxidation of the catalytic material. The organic matter on spent catalysts may be removed by burning, by extraction with organic solvents, by steam distillation or by other convenient means. The reoxidation can be effected by heating in air or by heating in the presence of an oxidizing atmosphere.

A particularly convenient method for reactivating these catalysts is accomplished by effecting partial or complete solution of the catalytic material, drying and reigniting to effect decomposition to the oxides. For example, nitric acid may be added to the spent catalytic material and then the mass ignited at a temperature sufficiently high to effect decomposition to the oxides. In this manner the reactivated catalyst is essentially the same as an entirely new preparation of the catalyst.

Suitable conditions for the hydrogenation of esters to alcohols with these catalysts are in general the same as with copper containing catalysts which are well known to those skilled in the art. In general, the temperatures suitable are between 200 and 400° C. We prefer temperatures between 250 and 300° C. for most hydrogenations of esters to alcohols. The exact pressure used is not particularly important. It is well known that the rate of hydrogenation is usually increased with increase in pressure. We prefer pressures between 100 and 200 atmospheres; however higher or lower pressures can be used.

The following examples will illustrate the preparation and use of these catalysts but are not intended to limit the invention to the details shown since the process may be otherwise carried out within the scope of the appended claims.

Example 1

A cobalt-silver catalyst was prepared as follows: A solution of 39.5 g. of cobalt nitrate and 3.15 g. of silver nitrate in 90 cc. of water was mixed intimately with 90 g. of powdered diatomaceous earth. The resulting damp mass was heated at 600° C. until all the nitrates were decomposed.

6 g. of the resulting catalyst finely ground and 80 g. of palm oil were agitated at 260° C. for 2 hours at 3,000 lbs. per square inch hydrogen pressure in a suitable apparatus.

The product was 85.2% hydrogenated on the basis of change of saponification number. It had an acid number of 0.2. A determination of the hydroxyl number showed that 85.2% of the hydrogenated palm oil was present as the corresponding alcohols. The alcohol was obtained practically free of ester by distillation.

6 g. of catalyst prepared similar to the above and 80 g. of castor oil were agitated 2 hours at 260° C. and 3,000 lbs. per square inch hydrogen pressure. The product was 70.8% hydrogenated to the corresponding octadecane diol.

Example 2

A cobalt-silver catalyst was prepared as follows: A solution of 19.8 g. of cobalt nitrate and 1.8 g. of silver nitrate in 45 cc. of water was mixed intimately with 45 g. of powdered diatomaceous earth. To this mass was added with stirring a 10% solution of sodium hydroxide until the material was neutral to litmus. The material was filtered, washed 10 times with water, dried at 100° C. and then heated at 600° C. until complete decomposition of the hydroxides was effected.

8 g. of this catalyst and 80 g. of palm oil was agitated under the same conditions as in Example 1. A 77.0% yield of the corresponding alcohol was obtained.

Example 3

An unsupported cobalt-silver catalyst was prepared as follows: A solution of 19.8 g. of cobalt nitrate and 1.8 g. of silver nitrate in 30 cc. of water was evaporated to dryness with stirring. The mass was ignited at 600° C. until complete decomposition of the nitrates was effected.

2 g. of this catalyst and 80 g. of palm oil were agitated under the same conditions as in Example 1. The product contained 77.2% of the corresponding alcohols.

Example 4

A cobalt-silver catalyst was prepared in the same manner as in Example 1 except that the weight of silver nitrate used was such as to give a ratio of cobalt to silver of 1:1.

6 g. of this catalyst and 80 g. of cocoanut oil were agitated under the same conditions as in Example 1. The product contained 69.8% of the corresponding alcohols.

Example 5

A cobalt-silver catalyst was prepared starting with cobalt acetate and silver nitrate as follows: 17.4 g. of cobalt acetate was dissolved together with 1.6 g. of silver nitrate in 45 cc. of water to which sufficient nitric acid was added to make a clear solution. This solution was mixed intimately with 45 g. of powdered diatomaceous earth. The mass was dried with stirring and then ignited at 500° C. until complete decomposition of the nitrates was effected.

6 g. of this catalyst and 80 g. of butyl stearate was shaken 3 hours at 260° C. and 3,000 lbs. per square inch hydrogen pressure. 39.2% of the ester was hydrogenated and of this over 90% consisted of the corresponding alcohols.

6 g. of this catalyst was prereduced in hydrogen at 450° C. and then shaken with 80 g. of palm oil for 2 hours at 260° C. and 2,000 lbs. per square inch hydrogen pressure. The product was 18.2% hydrogenated to the corresponding alcohols.

6 g. of this catalyst and 80 g. of palm oil was shaken 2 hours at 325° C. and 2,000 lbs. per square inch hydrogen pressure. The product was 42.1% hydrogenated to the corresponding alcohols.

12 g. of this catalyst and 80 g. of palm oil was shaken 6 hours at 225° C. and 3,000 lbs. per square inch hydrogen pressure. The product was 88.9% hydrogenated to the corresponding alcohols.

Example 6

A spent catalyst as described and used in Example 1 was recovered and reactivated by burning off the organic matter, moistening the mass with nitric acid and then heating the mass with stirring at 600° C. until the evolution of nitrogen oxides ceased.

6 g. of this recovered catalyst and 80 g. of palm oil were agitated for 2 hours at 260° C. and 3,000 lbs. per square inch hydrogen pressure. The product was 83.4% hydrogenated as determined by lowering of the saponification number and over 90% of the portion hydrogenated was obtained as the corresponding alcohols practically free of ester by distillation.

Example 7

A cobalt-silver catalyst was prepared by spraying a solution of 100.6 g. of cobalt nitrate and 16.0 g. of silver nitrate in 500 cc. of water on 160 g. of 12–20 mesh pumice particles in a heated pan with agitation. The material was dried and then heated at 600° C. until decomposition of the nitrates was effected.

Cocoanut oil was passed over 170 g. of this catalyst in a suitable apparatus at 260° C. and 3,000 lbs. per square inch hydrogen pressure at the rate of 30 g. per hour for 48 hours. The product was 40% hydrogenated to the corresponding alcohols.

Other esters have been hydrogenated to the corresponding alcohols under similar conditions, such as ethyl acetate, lauryl laurate, lauryl esters of mixed fatty acids of cocoanut oil, dicapryl sebacate, ethyl phenylacetate, cottonseed oil etc.

What we claim is:

1. The process of hydrogenating esters of carboxylic acids to alcohols which comprises subjecting the esters to the action of hydrogen at a temperature between about 200–400° C. and a pressure of from about 100–200 atmospheres in the presence of a hydrogenating catalyst, the active ingredient of which consists essentially of a mixture of the oxides of cobalt and silver.

2. The process of hydrogenating esters of the higher aliphatic acids to alcohols corresponding to the aliphatic acid which comprises subjecting the ester to the action of hydrogen at a temperature between 200–400° C. and a pressure of from 100–200 atmospheres in the presence of a catalytic composition the active component of which consists essentially of a mixture of the oxides of cobalt and silver.

3. The process of hydrogenating glycerides to alcohols corresponding to the acid group thereof, which comprises subjecting the glyceride to the action of hydrogen at a temperature between 200–400° C. and a pressure of from 100–200 atmospheres in the presence of a catalytic composition the active component of which consists essentially of a mixture of the oxides of cobalt and silver.

4. The process which comprises hydrogenating vegetable oils to the alcohol corresponding to the acid groups thereof which comprises subjecting the vegetable oils to the action of hydrogen at a temperature between 200–400° C. and a pressure of from 100–200 atmospheres in the presence of a catalytic composition the active component of which consists essentially of a mixture of the oxides of cobalt and silver.

5. The process of hydrogenating palm oil to the alcohols corresponding to the fatty acid groups thereof, which comprises subjecting palm oil to the action of hydrogen at a temperature between 200–400° C. and a pressure of from 100–200 atmospheres in the presence of a catalytic composition the active component of which consists essentially of a mixture of the oxides of cobalt and silver.

6. The process of hydrogenating cocoanut oil to the alcohols corresponding to the fatty acid groups thereof, which comprises subjecting cocoanut oil to the action of hydrogen at a temperature between 200–400° C. and a pressure of from 100–200 atmospheres in the presence of a catalytic composition the active component of which consists essentially of a mixture of the oxides of cobalt and silver.

7. The process of hydrogenating esters of carboxylic acids to alcohols corresponding to the acid group thereof which comprises subjecting the ester to the action of hydrogen at a temperature between 200–400° C. and a pressure of from 100–200 atmospheres in the presence of a catalytic composition the active component of which consists essentially of a mixture of cobalt oxide and one or both members of the group consisting of silver and silver oxide.

8. The process of hydrogenating glycerides to alcohols corresponding to the acid group thereof which comprises subjecting the glyceride to the action of hydrogen at a temperature between 200–400° C. and a pressure of from 100–200 atmospheres in the presence of a catalytic composition the active component of which consists essentially of a mixture of cobalt oxide and one or both members of the group consisting of silver and silver oxide.

9. The process of hydrogenating vegetable oils to alcohols corresponding to the acid group thereof which comprises subjecting the vegetable oil to the action of hydrogen at a temperature between 200–400° C. and a pressure of from 100–200 atmospheres in the presence of a catalytic composition the active component of which consists essentially of a mixture of cobalt oxide and one or both members of the group consisting of silver and silver oxide.

10. The process of hydrogenating palm oil to alcohols corresponding to the acid group thereof which comprises subjecting the palm oil to the action of hydrogen at a temperature between 200–400° C. and a pressure of from 100–200 atmospheres in the presence of a catalytic composition the active component of which consists essentially of a mixture of cobalt oxide and one or both members of the group consisting of silver and silver oxide.

11. The process of hydrogenating cocoanut oil to alcohols corresponding to the acid group thereof which comprises subjecting the cocoanut oil to the action of hydrogen at a temperature between 200–400° C. and a pressure of from 100–200 atmospheres in the presence of a catalytic composition the active component of which consists essentially of a mixture of cobalt oxide and one or both members of the group consisting of silver and silver oxide.

12. In the process of producing alcohols by the catalytic hydrogenation of esters of carboxylic acids the improvement that consists in using as the catalyst a composition the active component of which consists essentially of a mixture of cobalt oxide and a member of the group consisting of silver and silver oxide in amounts sufficient to catalyze the reaction.

13. In the process of producing aliphatic alcohols by the catalytic hydrogenation of esters of aliphatic acids the improvement that consists in using as the catalyst a composition the active component of which consists essentially of a mixture of the oxides of cobalt and silver in amounts sufficient to catalyze the reaction.

14. In the process of producing aliphatic alcohols by the catalytic hydrogenation of fatty acid glycerides the improvement that consists in using as the catalyst a composition the active component of which consists essentially of a mixture of the oxides of cobalt and silver in amounts sufficient to catalyze the reaction.

LLOYD W. COVERT.
CHESTER E. ANDREWS.